(12) United States Patent
Florez

(10) Patent No.: US 10,589,198 B2
(45) Date of Patent: Mar. 17, 2020

(54) HIGH FLOW, LOW HOLD UP FILTERS

(71) Applicant: Marin Scientific Development Company, San Rafael, CA (US)

(72) Inventor: Peter Florez, Greenbrae, CA (US)

( * ) Notice: Subject to any disclaimer, the term of this patent is extended or adjusted under 35 U.S.C. 154(b) by 491 days.

(21) Appl. No.: 15/070,844

(22) Filed: Mar. 15, 2016

(65) Prior Publication Data

US 2016/0310875 A1 Oct. 27, 2016

Related U.S. Application Data

(60) Provisional application No. 62/135,944, filed on Mar. 20, 2015.

(51) Int. Cl.
| | | |
|---|---|---|
| *B01D 29/31* | (2006.01) | |
| *B01D 35/02* | (2006.01) | |
| *B01D 35/30* | (2006.01) | |
| *B01D 29/21* | (2006.01) | |
| *B01D 29/23* | (2006.01) | |
| *B01D 29/54* | (2006.01) | |
| *B01D 35/027* | (2006.01) | |

(52) U.S. Cl.
CPC ............ *B01D 29/31* (2013.01); *B01D 29/21* (2013.01); *B01D 29/232* (2013.01); *B01D 29/54* (2013.01); *B01D 35/027* (2013.01); *B01D 35/30* (2013.01); *B01D 2201/02* (2013.01); *B01D 2201/12* (2013.01)

(58) Field of Classification Search
CPC ...... B01D 29/31; B01D 29/54; B01D 29/232; B01D 29/21; B01D 35/027; B01D 35/30; B01D 2201/12; B01D 2201/02
See application file for complete search history.

(56) References Cited

U.S. PATENT DOCUMENTS

| 4,664,682 A | * | 5/1987 | Monzen | A61M 1/3627 128/DIG. 3 |
|---|---|---|---|---|
| 5,632,894 A | * | 5/1997 | White | A61M 1/3627 210/436 |
| 6,136,189 A | * | 10/2000 | Smith | C02F 1/002 210/266 |
| 2004/0149647 A1 | * | 8/2004 | Hampton | B01D 24/008 210/497.01 |
| 2008/0290040 A1 | * | 11/2008 | Kane | B01D 29/05 210/741 |
| 2009/0193880 A1 | * | 8/2009 | Halverson | G01N 1/18 73/64.56 |
| 2010/0243554 A1 | | 9/2010 | Herrin | |

FOREIGN PATENT DOCUMENTS

WO WO-9819722 A1 * 5/1998 .......... A61M 1/3633

OTHER PUBLICATIONS

International Search Report, dated Jul. 28, 2016, Aridis, PCT/US2016/022480.

* cited by examiner

*Primary Examiner* — Krishnan S Menon
*Assistant Examiner* — Waqaas Ali
(74) *Attorney, Agent, or Firm* — Gary Baker

(57) ABSTRACT

Filter devices with a flow director surrounded by a filter element providing a large filter surface area and low fluid volumes for efficient filtration and high recovery of sample fluids. The filter device can be configured with dimensions and sealing surfaces to functionally interact as a pre-filter for common usage disposable filter flasks.

38 Claims, 11 Drawing Sheets

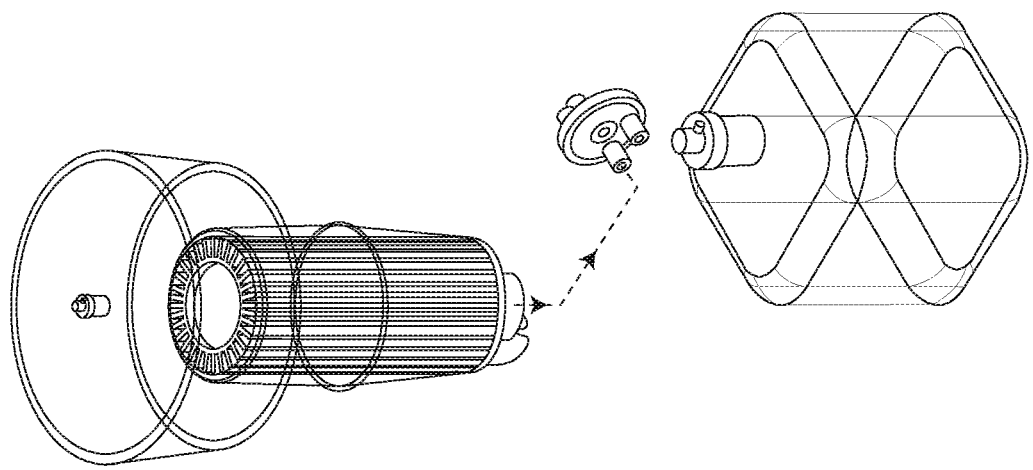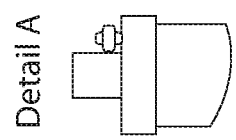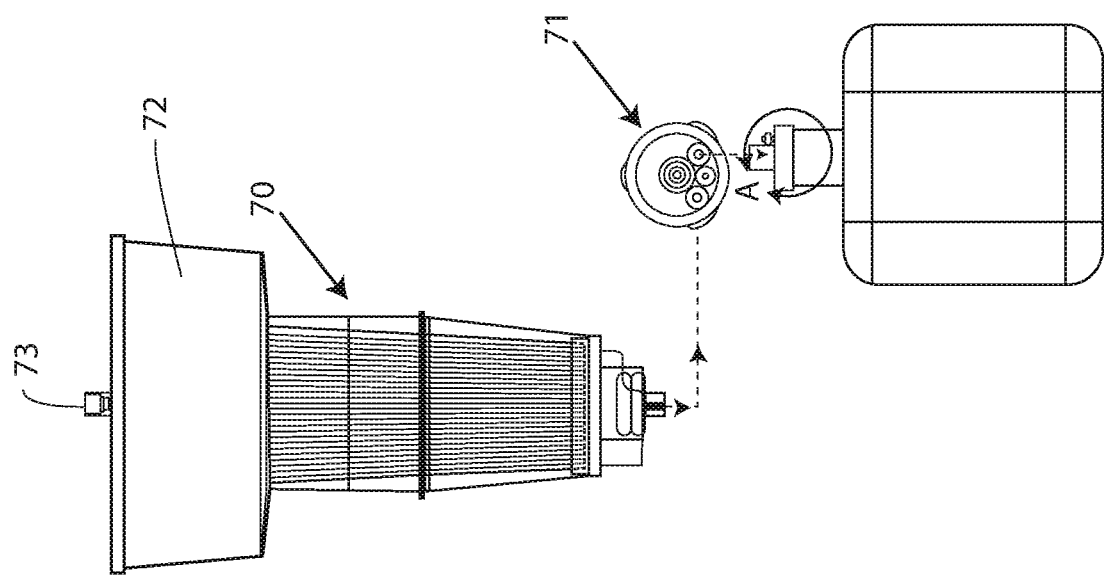
Fig. 7

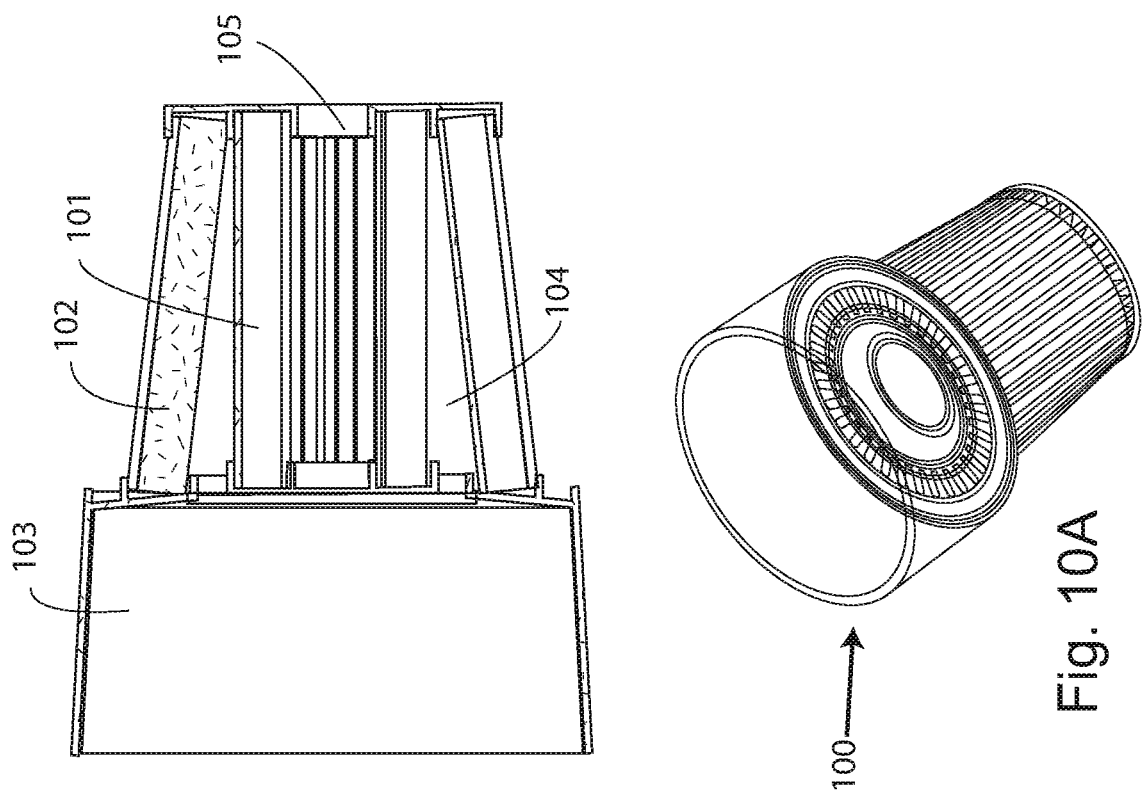

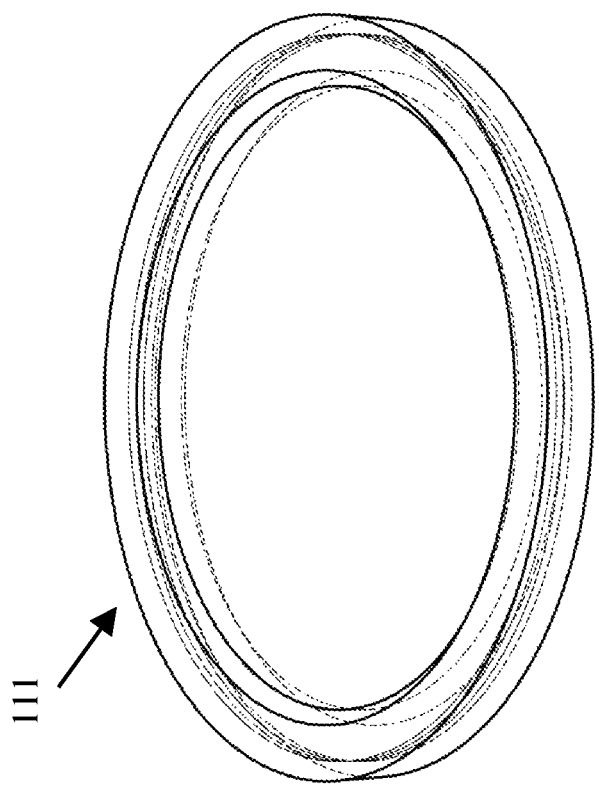
Fig. 11A
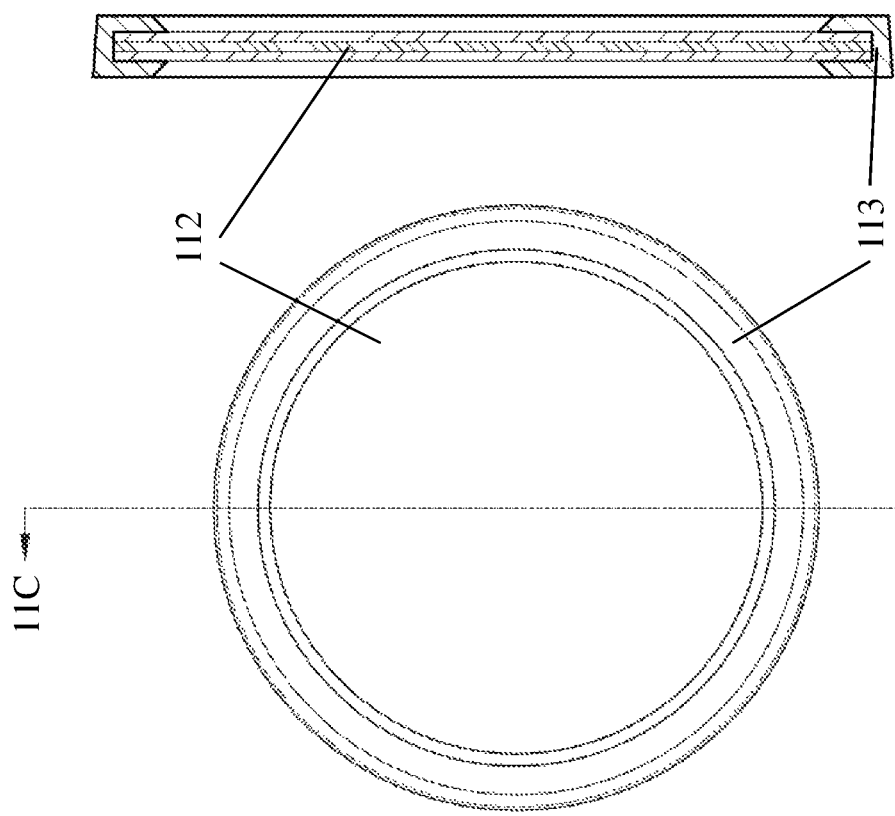
Fig. 11B
Fig. 11C

HIGH FLOW, LOW HOLD UP FILTERS

FIELD OF THE INVENTION

Filters and prefilters having a high surface area in a small volume. Filters made more efficient in flow through and recovery using a flow director inside a cylindrical filter to expose final small volumes to a larger filter surface area.

BACKGROUND OF THE INVENTION

It can be difficult to harvest conditioned media from a suspended cell culture product. In eukaryotic or prokaryotic cultures the total solids can be quite high (e.g., 10%) and the required level of particulate clearance may be to sterilization levels (e.g., not more than 1 micron). The end phase culture can include aggregations of cells and debris that quickly clog prior art filters. Previously, it has been nearly impossible to directly filter more than a small volume of cell culture harvest before the end filter becomes clogged. Typically, researchers have first removed the bulk of cells and cell debris from a cell culture by centrifugation before attempting end filtration. However, this is slow, expensive, and labor intensive. Even with a centrifugation step, filters often become clogged after only a small volume of filtrate has passed through the filter. The researchers must then throw away the first filter and continue the operation with one or more additional filters, until the job is done.

One way to increase the amount of filtrate that can pass through a final filter and to delay clogging is to increase the area of the filter surface. In Meyer et, al., (U.S. Pat. No. 5,232,595), filter surface is increased by arranging a large amount of filter material in a pleated arrangement around a central cavity. Sample fluid flows into the central cavity and is filtered radially, with the filtrate collected on the exterior of the filter in a sealed cartridge. Still the problem of clogging remains. Moreover, there is a tendency for such filters to filter and clog more at the bottom of the filter, particularly at the beginning and end of filtration. The pleated cylinder design presents significant recovery efficiency issues, e.g., in harvesting the final sample volume (trapped at the clogged bottom of the filter, e.g., with the sample pump full of air and no longer able to transfer liquids).

To partially mitigate these problems, most commercially available disposable filter units come with an optional "depth filter" of larger pore size to place in front of the final filter disk. This can help in some cases, but clogging is often only delayed by a small percentage of additional volume, and centrifugation is usually still required for most uses. For example, see Davis et al, (US 2005/0191619) wherein a prefilter of greater pore size is placed in front of the final filter of smaller average pore size. Often, such filter systems clog rapidly with the of bulk cells in the prefilter or with prefiltered sample still clogging the final filter.

In view of the above, a need exists for filter systems that can filter a larger amount of sample before clogging. We believe it would be desirable to have filter designs with smaller residual volumes, e.g., to increase overall sample filtrate recovery. The present invention provides these and other features that will be apparent upon review of the following.

SUMMARY OF THE INVENTION

The filtration devices of the inventions provide, e.g., high volume filtration flows, at lower pressure differentials, and with higher overall recoveries. Substantial depth and/or surface areas of the prefilters can receive large amounts of crude samples while passing on relatively clarified filtrates to a final filter for polishing without clogging. The present systems function so well in handling crude samples (such as end cell cultures or lysates) that a centrifugation step may not be necessary preliminary to filtration.

A filtration device of the invention can include a filter (e.g., a cylindrical, polygonal, or conical filter element) surrounding a filter central axis, a top end, a bottom end, an external filter surface, an internal filter surface, and an internal space between the central axis and internal filter surface. Within the filter internal space, a flow director can be positioned to displace more of the internal space toward the bottom end of the filter than it displaces toward the top of the filter. At the end of a filtration, a central sleeve can be inserted into the internal space to further displace retentate and improve recovery. Thus, the small volume of sample at the end of a filtration process is exposed to a larger filter surface area than for conventional filters, e.g., for less clogging and higher recovery.

The filters can be of any type appropriate for the sample to be filtered. For example, the filter can be a filter sheet, a depth filter, a pleated sheet, an open cell foam, and/or the like. The filter pleats or folds can be, e.g., directed horizontally or vertically. The filters can be shaped, molded, pleated, folded gusseted, and or the like, to functionally fit into the filter device body, e.g., around the central filter axis. In many preferred embodiments, the filter can be made from a pleated sheet of filter membrane or fiber mat of filter material. The filter material is typically formed into a cylindrical, conical, or conic section shape (though it can have other appropriate shapes, e.g., that laterally surrounds (e.g., encompass) the sample a fluid volume). In one embodiment, the filter is a pleated type with a generally conical shape, e.g., splayed out toward the top of the filter. Alternately, the filters can be splayed out toward the bottom. The filters are often employed as prefilters (though they can be, e.g., the final or only filter), e.g., with average pore sizes typically ranging from less than about 3 microns to more than 10 microns.

The flow directors can be any shape to direct sample inflows more effectively to the filter surfaces, as described herein. Flow directors are typically not merely uniform tubes or internal housing supports of cylindrical or conical filters. The flow directors are typically configured to provide a smaller remaining interior space (not occupied by the director) between the flow director and filter at the bottom of the filter than the remaining interior space at or near the top of the filter. For example, the flow director can have a parabolic or triangular cross-section in a plane through the central axis of the filter, with the narrower end up. Optionally, this feature (interior space decreasing in the direction of flow) can be obtained by the filter element intruding more to the central interior space efferently (toward distal flow or bottom) and/or the flow director taking up more of the internal space efferently.

The filter devices often have a flange near the top of the filter element to provide a structure for sealing and mounting of other device elements. For example, the device can include shoulder flange extending radially out from the filter top end in a plane perpendicular to the central axis. Further, a sample reservoir can be mounted, e.g., to the top side of the flange, and the bottom side can have a sealing surface (e.g., a resilient gasket). A bottom lateral flange can extend out radially from or near the bottom end of the flow director or housing bottom, with the flange comprising a top surface in sealing contact with the filter bottom end. The flange can be configured to seal against the top edge of a final filter reservoir. A spacing (ring) adaptor can be positioned between the filter device and final filter, e.g., to allow a larger filter in the final filter reservoir. The flange can be planar, or, e.g., describe a conic section. Optionally, the filter housings can have sealed side walls and connectors at the top and/or bottom (hermetically sealed system) to sealably attach to culture vessels, conduits, pumps, and/or receiving vessels.

A sample reservoir can be positioned above the filter top end and hermetically sealed to the filter top end or flange. The reservoir typically has a volume ranging from less than about 10 ml to 10 L or more or about 50 ml to 2 L. The filter can be sealed to the other filter device elements using, e.g., polymerizing resins, or hot melt thermoplastics.

The filter device can be positioned in a reservoir of a vacuum filter apparatus (such as a commonly available disposable final filter flask). A vacuum pump (optionally disposable) or filtrate pump can be functionally integrated into the filter device or the vacuum filter apparatus. Optionally, the filter device can have a removable or integrated manifold with a port configured for connection to a vacuum source.

In an alternate aspect, the filter device can include a cylindrical or conical filter element mounted within a cylindrical or conical housing and comprising a central axis, a top end, a bottom end, an outer surface, an inner surface, and an inner cavity having a volume between the central axis and filter inner surface. The housing can comprise a cylindrical or conical body comprising a top, bottom, and sides; and, a housing top end comprising a shoulder flange extending radially from a central opening. The housing sides (e.g., below the flange) can be perforated to allow flow of filtrate out of the filter. The filter element can, e.g., provide its own support, have a firm supporting layer, or a support frame. The flange can extend from the central opening across the filter top end, and extend radially in a plane beyond the body. A housing bottom end can extends across the cylindrical body bottom, sealing the filter exterior from the filter interior. The housing bottom end can include an outlet port for filtrate coming through an internal filter pack (e.g., positioned as a flow director).

The filter device can have a flow director comprising a top end and a bottom end, and be mounted within the inner cavity. The flow director can have a smaller cross-section at the top end (e.g., end toward sample input) than at the bottom end (e.g., end toward filtrate outlet). That is, e.g., a vertical cross-section through the flow director can taper in from bottom to top. The flow director can have a vertical cross-section through a center describing a conic section. The radial distance between the flow director top end and the filter can be, e.g., at least two or three times a radial distance between the flow director bottom end and the filter. The top end of the flow director can be, e.g., at least 0.5 inch below the filter top end, and the bottom end of the flow director not more than 0.25 inch from the filter bottom end. The flow director can be impermeable, or act as a second (internal) filter element.

The filter element can be a bulk filter, a depth filter, a membrane filter, and/or the like. In many embodiments, the filter is a pleated sheet or quilt of filter membrane and/or fiber material. The filter element can be adapted for filtration with an average pore size of 20 microns, 5 microns, or less. The depth dimension (traversly through the media) of the filter pleats or bulk filter media can range from less than about 0.05 inches to more than about 2 inches, or about 0.1 inch to about 1 inch. The diameter of the inner cavity can range from less than about 0.5 inches to more than 10 inches, or from about 1.5 inches to about 3 inches. In some aspects, the filter element can include one or more afferent filter layers inside an efferent filter element (e.g., co-laminated), and the average pore size of the afferent filter layers can be greater than an average pore size of the efferent filter element. Alternately, the filter element can have a pore size gradient of increasingly smaller pores from the inside to the outside of the filter.

The shoulder flange diameter can range from less than about 3 inches to about 7 inches or more. The shoulder flange can extend radially from the housing body a distance ranging from less than about 0.25 inches to about 3 inches or more. The shoulder flange can also include a sealing surface on a planar (or tapered) bottom side of the flange extension beyond the body. The flange bottom side can include a resilient seal material (e.g., a gasket or silicone layer). The filter top end can be fluidly sealed to the shoulder flange, while the filter bottom end is fluidly sealed to the housing bottom end. In some embodiments, the housing bottom does not include an outer sealing surface, or the housing bottom does not include a flange extending radially beyond the housing body.

The filter devices of the invention can be configured, e.g., to mount functionally within the receiver (sample reservoir) of a disposable filter flask having an average pore size at least 50% less that an average pore size of the filter element. Optionally, the filter device can have a threaded connection or tubing fitting connection in sealed fluid contact with the afferent side of the final filter system. Such sealed versions of the filters can be capsules and physically oriented any direction during use.

Definitions

Before describing the present invention in detail, it is to be understood that this invention is not limited to particular devices, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content clearly dictates otherwise. Thus, for example, reference to "a surface" can include a combination of two or more surfaces; reference to "particles" includes mixtures of particles, and the like.

Unless defined otherwise, all technical and scientific terms used herein have the same meaning as commonly understood by one of ordinary skill in the art to which the invention pertains. Although any methods and materials similar or equivalent to those described herein can be practiced without undue experimentation based on the present disclosure, preferred materials and methods are described herein. In describing and claiming the present invention, the following terminology will be used in accordance with the definitions set out below.

As used herein, the directional terms refer to common usage at locations on the surface of the earth. For example a top surface is above a bottom surface. Horizontal is perpendicular to the force of gravity, and vertical is parallel to the force of gravity at a local environment. Typically filters of the invention filter liquid samples with the sample fluid top surface horizontal and the flow of filtrate generally down vertical and generally parallel to the central axis of the filter. An internal surface of a cylindrical or conical object is that surface facing the central axis of the object. Radial is a line originating at an axis and progressing outwardly. The radial of a cylinder is perpendicular to the axis of a cylinder. Although the filter devices are described herein, e.g., with reference to a central filter axis being "vertical" this is a reference orientation for discussion of the devices. We note that, particularly where the filter reservoir is not open, the central axis of the filter can be other than "vertical", as spilling can be eliminated, e.g., with capsular designs. We note that the axis of a filter element can be tilted to any angle, in use.

A "flow director", as used herein is a body in the space between the central axis of a filter and the internal surface of the filter but not in contact with the filter along most of its surface or length inside the filter. For example, where the filter is a hollow cylinder or hollow cone, the flow director would be located in the hollow interior space of the filter, e.g., mostly spaced away from the filter or mostly spaced away from the inner folds of a pleated filter. The flow director generally occupies a larger cross-section across the central axis at or near the bottom of the filter than at or near the top of the filter. In this way, the flow director can function to wet a larger filter surface with a smaller amount of sample, e.g., as a filtration process reaches the end. In some embodiments, the flow director can take up about the same cross sectional space top to bottom internal to the filter element, but the interior space reduces efferently, e.g., because the filter element intrudes more axially toward the bottom.

The "reservoir" of a filter system is the container that holds the sample on the afferent (proximal) side of the filter before it is filtered. A sample reservoir can be a chamber above the top of the filter element.

A "prefilter" is a filter in sequence before a final filter in a filtration process. Typically the prefilter has a larger average pore size than the final filter. Usually, the filtrate of the prefilter flows directly onto the next filter of a process (e.g., final filter) without holding the prefiltrate as a process intermediate.

Two components of a device are "sealed" at their points of contact when an associated working fluid does not pass through the points of contact under working pressures, as is understood in the art.

BRIEF DESCRIPTION OF THE DRAWINGS

FIG. 7 is a schematic diagram of an exemplary 10 L filter system.

FIG. 9A is an outer view of a representative center sleeve, e.g., adapted to reduce the internal filter volume of many prefilters described herein. FIG. 9B is a side view of the sleeve. FIGS. 9 C and D show a top down view and axial cross-section of the sleeve.

FIGS. 10A to 10C are exemplary diagrams of a filter device having both an inner and an outer filter element. FIG. 10A is a perspective view of a prefilter having an outer filter element, and also an inner filter element, e.g., in a position similar to that of a flow director in other embodiments discussed herein. FIG. 10B shows a top down view of the prefilter. FIG. 10C shows an axial cross-section of the filter.

FIGS. 11A to 11C are exemplary diagrams of a course filter adapted to be placed before the present prefilter devices to remove gross particles. FIG. 11A is a perspective view of a course filter having an outer sealing ring surrounding a course laminated filter disk. FIG. 11B shows a top down view of the course filter. FIG. 10C shows an cross-section of the course filter.

DETAILED DESCRIPTION

Filter devices and methods are provided to efficiently filter liquid samples having high levels of suspended solids with good recovery. In many cases, the filter devices can act as prefilters to clear enough solids from a cell culture so that a single finishing filter can fully clarify and/or sterilize many-fold more product than without the prefilter.

Filter devices can include a conical or cylindrical pleated filter element (or filter element of another shape surrounding a central interior) around a flow director to effectively direct liquid samples for high yields. Alternately the filter is not pleated (e.g., foam or flat) and/or the filter element has an alternate appropriate shape. The filter device can have flanges to seal against, e.g., a final filter sample reservoir, allowing the prefilter to use the same vacuum (pressure differential) source for prefiltration and final filtration in a single step. In some embodiments, the filter device can include a port to receive a vacuum source to draw filtrate into a container. Other filter devices include prefilter and/or post filter sealed threads of fittings to provide sealed transfer of conditioned media from a culture vessel to a receiving vessel.

Methods include provision of the filter device, insertion of the device into the sample reservoir of a final filter, filling the device with cell culture sample, and applying a vacuum to the final filter filtrate (efferent) side, whereby the bulk of cells and cell debris is captured in the device without clogging, and the prefiltrate has so few solids and particles that large volumes of conditioned media can be clarified or sterilized in the final filter. In most cases, a preliminary centrifugation step is not required to obtain a high yield conditioned media harvest when using the filtration device. Alternately, filtrate can be forced through the filter device using vacuum, pumps, and/or gravity to urge fluids through the filters in systems sealed with connectors (threads and pressure fittings) commonly available in the field.

Filtration Devices.

The efficient filtration devices can include a combination of complementary features that together simplify and increase efficiency of filtration processes involving samples containing large amounts of particles. The devices can have, e.g., conical pleated filter elements in a housing providing structure and flanges for sealing to final filter reservoirs. The filters can include a flow director in the interior space of the filter to direct sample uniformly onto the filter and increase the filter surface area contact when sample volumes are reduced, e.g., at the end of a filtration step.

Figure 1:
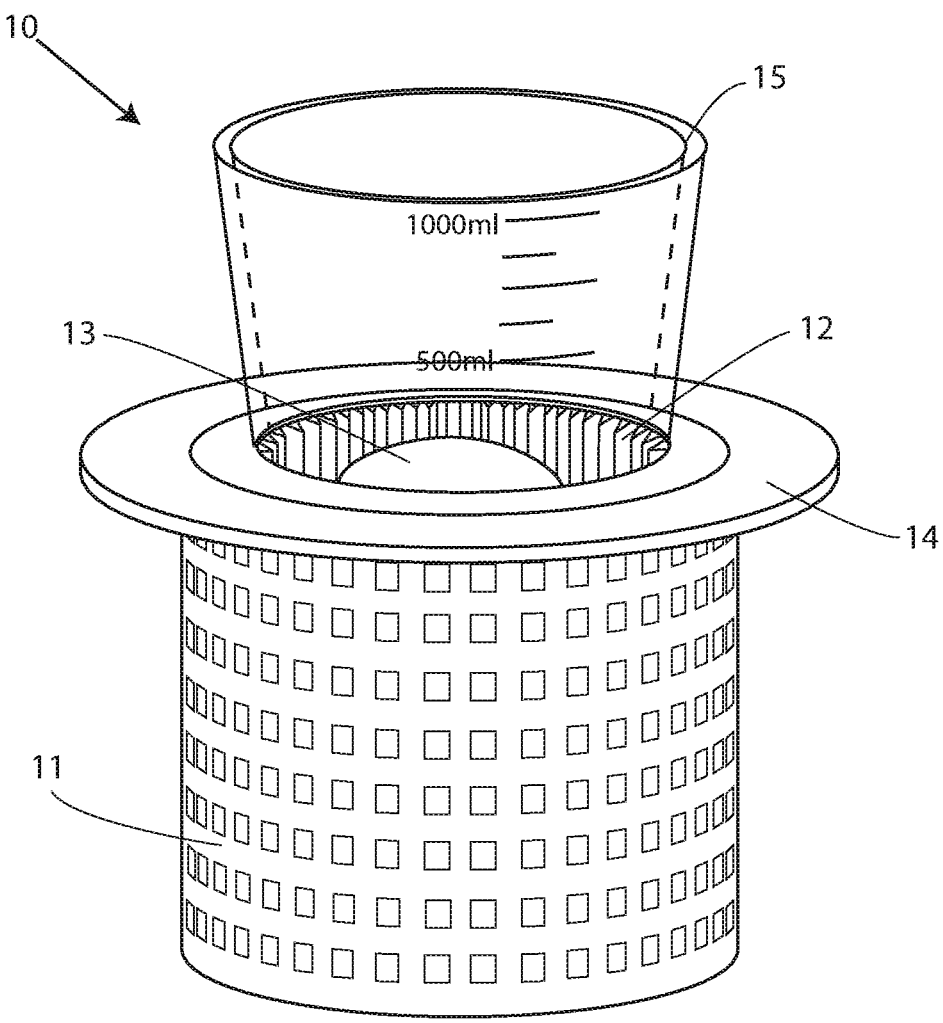
FIG. 1 is a schematic diagram of a filter device having a cylindrical filter element.

As shown in FIG. 1, the filtration device 10 includes a housing 11 supporting cylindrical pleated filter element 12. Inside the filter element is a flow director 13 to direct fluid flows against the interior surfaces of the filter element. The housing includes flange 14 to support the filter device across the top of a disposable final filter reservoir. The bottom surface of the flange can seal against a final filter reservoir to take advantage of the same vacuum source as the final filter for both prefilter and final filter steps. The filter device can have a sample reservoir 15 to receive any desired volume of sample for filtration.

I. The filter elements are typically configured with a general topography surrounding applied sample with internal filter surfaces. For example, the filter element will have an inflow port (e.g., top opening) to receive sample, however, once inside the filter element the sample is surrounded by 360 degrees of filter material. Conical or cylindrical filter elements will have a circular cross section. Alternately, the filters can surround the internal volume with other geometric shapes, e.g., having oval, triangular, square hexagonal, cross-sections, and/or the like. So that the filter does not have to be sealed from the environment to prevent spillage, the inflow port is usually at the top of the filter element, allowing a technician to simply pour sample into the filter element or into a reservoir above the inflow port. Alternately, the sample can be applied through a sealed fluid flow system.

The filter elements can surround sample, enhancing the area of filter surface in a small volume. Filter elements can be shaped as a container or as a conduit. The overall topography of the filter element can be described, e.g., as a cylinder, cone, square stock conduit, cone with the point end removed, a cup, a sphere, a parabolic trajectory, and/or the like. In preferred embodiments, the filter element has a cylinder or conical shape; these shapes can provide enhanced surface to volume ratios and strength against pressure differentials. Where the filter element has an open bottom end, the opening is typically sealed with a housing floor and/or flow director bottom.

The filter element is often a depth filter capable of retaining or capturing a large volume of particulate material. For example, the filter material can be a deep layer of foam or randomly oriented fibers, with a relatively large average pore size. In some cases, the pore size of the material in the filter can become progressively smaller (gradient pore size) between the filter interior surface and exterior (efferent) surface. In a preferred embodiment, the filter is a pleated cylinder or cone. Pleated cones can be formed by splaying out the top end of a pleated cylinder and sealing the open bottom end with a flow director or housing bottom wall.

The present devices can act as primary or single (final) filters. Usually, the devices are configured to act as prefilters with depth filter attributes or relatively course permeability to collect the macro and micro particles that would clog a final (e.g., sterilization) filter. When intended to act as prefilters, the filter elements will generally have an average pore size ranging from, e.g., more than 100 µm to less than 0.1 µm, more than 50 µm to less than 1 µm, from 30 µm to 3 µm, from 20 µm to 5 µm, or about 8 µm. When intended as a final filter for conditioned media the pore sizes will generally be smaller, e.g., in the range from less than about 0.2 µm or less to 3 µm or more. In some cases, the filter element can have a pore size gradient, e.g., becoming smaller from the filter interior surface to the exterior surface, e.g., ranging from 100 µm to 5 µm across the thickness of the filter material.

Optionally, the filters themselves can have a course prefilter, to remove cell and polymer aggregations. For example, the top opening of the filter element interior can include a course filter to keep large aggregates from passing from the reservoir to the filter element interior space.

Although the filter elements can be long, they typically have height, width and depth at about the same order of magnitude. The height (e.g., from top to bottom) can range from more than about 1 m to less than about 1 cm, from 50 cm to 2 cm, from 25 cm to 5 cm, or about 10 cm. The width and depth are typically about the same for the filter elements, e.g., because of a general radial symmetry of laboratory filter systems. The width and or over all depth (vertical height in use) of the filter element can range from more than about 60 cm to less than about 0.5 cm, 30 cm to less than about 1 cm, from 25 cm to 3 cm, from 15 cm to 5 cm, or about 10 cm.

II. Flow directors fit inside the interior space of the filter element and define an interior space for fluid flows between the director and the filter element. The directors typically run from the area at or near the bottom of the filter element to an area at or near the top of the filter element. Near the bottom of the filter element, the director comes closer, or contacts the filter element, leaving only a small volume for sample at the bottom of the filter. Nearer to the top of the filter element the director typically occupies a smaller proportion (or none) of the filter interior cross-section, thus leaving a larger volume of space for sample near the top of the filter element.

Flow directors typically have a shape that gradually reduces in cross section from the bottom to the top. For example, a flow director can have a shape describing a pyramid, a cone pointing upward, a hemisphere, a parabolic dome, an inverted parabolic trajectory, and/or the like. In certain preferred embodiments, the flow director is a parabolic dome extending from the bottom of the filter element to the level of the filter element top. In other embodiments, the flow director does not change cross sectional area from top to bottom, e.g., having a cylindrical shape.

The flow directors generally take up less of the filter interior cross section moving from bottom to top. That is, e.g., they are generally tapered. At the bottom of the filter element interior, the flow director may contact the bottom of the filter element. At the top of the filter element interior, the director may only occupy point space, or the director may not actually extend all the way to the top of the interior space. The bottom of the flow director can take up from about 100% to less than about 40% of the cross sectional area of the bottom of the filter element, or from 99% to 50%, from 95% to 70%, from 90% to 80%. In most embodiments, the director takes up all or most of the cross sectional area of the interior space at the bottom of the filter element. The top of the flow director can take up from about 0% to less than about 1% of the cross sectional area of the top of the filter element, or about 2%, 5%, 10%, 25%, 50%, or more than 75% of the area. Flow directors typically take up more than half the volume inside the filter element, or from more than 90% to less than 30%, from 80% to 40%, or about 75%. Preferred flow directors can take up more volume interior to the filter element at the bottom half of the filter element than at the top. In some embodiments, the flow director is uniform in cross section but the internal space cross sectional area increases due to increased spacing of the filter element away from the flow director.

The flow directors can have a height and width about the same, but typically the directors are taller than wide. The height can range from more than about 1 m to less than about 1 cm, from 50 cm to 2 cm, from 25 cm to 5 cm, or about 8 cm. This can vary, e.g., according to the overall size of the filter device involved. The presence of the flow director can allow filter elements to be longer while retaining good sample recovery characteristics. The width and/or over all depth of the flow director can range from more than about 30 cm to less than about 1 cm, from 25 cm to 3 cm, from 10 cm to 4 cm, or about 5 cm.

Figure 2:
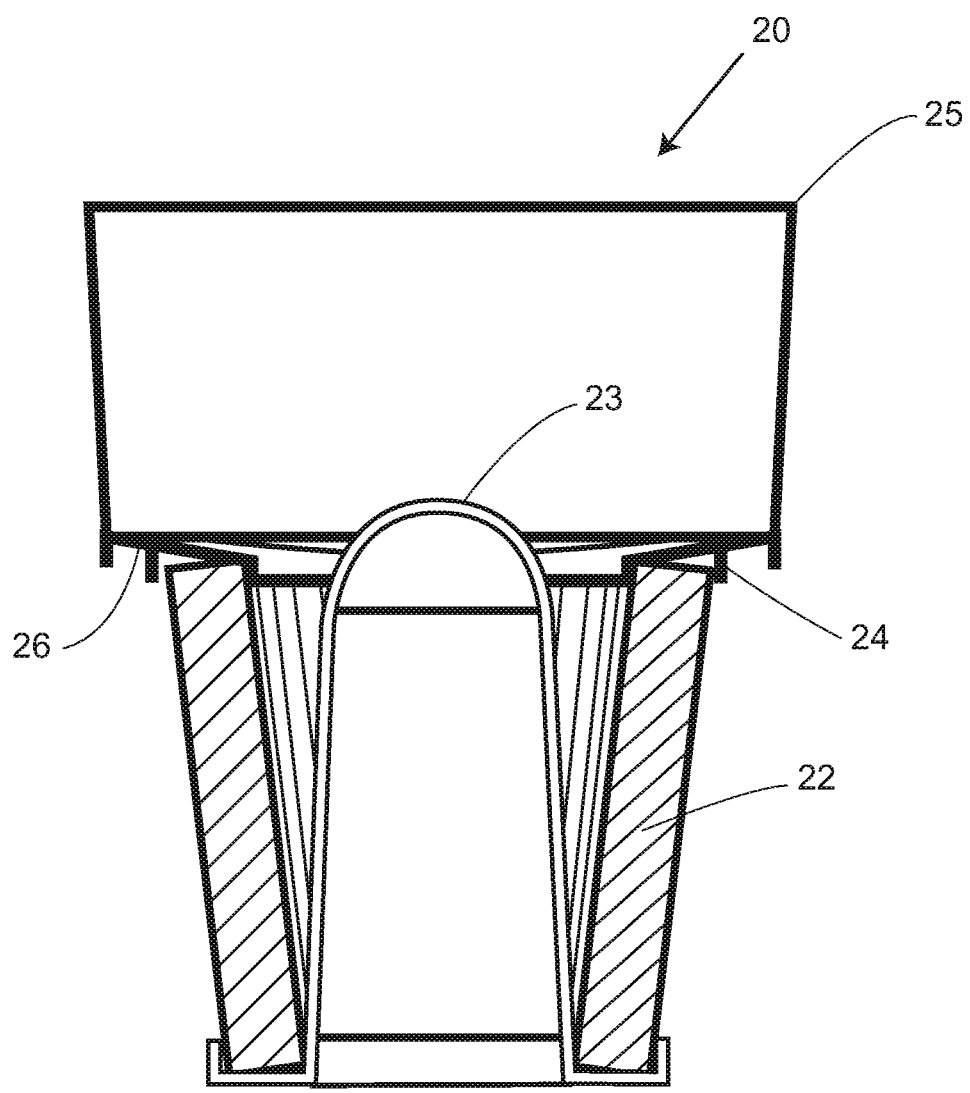
FIG. 2 is a schematic diagram of a filter device having a conical filter and parabolic flow director.

The flow directors can be sealed against fluid flows at the bottom of the filter element. In one aspect, a flange extends out radially from the bottom of the director and the filter element is sealed to the flange and/or supported by the flow director flange, e.g., as shown in FIG. 2.

III. The filter devices can include a housing (or frame members, e.g., top and bottom), e.g., to provide structure and to integrate the elements of the device. For example, a housing can provide an overall structure providing support to the filter element, which may not be sturdy, particularly when wet. The housing can also have extending top and/or bottom flanges that can provide sealing surfaces. The housings can provide structural support for mounting the flow director and/or a sample reservoir.

In certain embodiments, the housing will have a flange extending out at a level at or near the top of the filter element area. This flange can act as a sealing surface for the top of the filter element, as a mounting position for a sample reservoir, and/or to provide a contact surface for sealing the device to the top of a final filter sample reservoir top edge. The flange can be planar. Alternately, the flange can be tapered (e.g., up to about 30°), e.g., to aid in fitting and sealing to the reservoir of a final filter.

A bottom flange can extend out the bottom of the filter element area. This flange can act as a sealing surface for the bottom of the filter element and/or as a mounting position the bottom of a flow director (or second central filter). In many cases, this bottom flange expands out and is mounted to the bottom of the flow director.

The housing can have structural elements unifying top and bottom device elements, and supporting the filter element. For example, a cylindrical or conical wall, screen, or cage can run between the top and bottom device elements. The structure can strengthen the entire device. The structure can prevent the filter element from bowing out under the forces of working pressure differentials. The structure can allow permeation of filtrate from the filter into a collection vessel or into a final filter sample reservoir. In certain embodiments, the "housing" includes top and bottom elements not connected with other housing structures (walls, rods, etc.) but are connected through the filter element structures.

In certain embodiments, the housing side wall is not perforated but provides a sealed space between the wall and exterior surface of the filter element. The housing can include threaded fillings or sealed connectors providing a sealed filtrate flow path, e.g., through tubing, additional filters, fluid pumps, and/or filtrate receiving vessels.

IV. Reservoirs can be provided to retain additional volumes of sample while filtration is in progress. Optionally, the filter element interior space can act as a reservoir for sample to be filtered. As discussed above, the sample reservoir can be mounted, e.g., to the top of the filter element or a top housing flange to provide additional sample as earlier sample filtrate flows through the filter element. The fluids in reservoirs are typically intended to be gravity fed to the filter.

Depending on the size of the filter element, and expected clogging rate, the reservoir can vary considerably in size. In many instances, the reservoir has a volume approximately the same as a final filter reservoir or as the final filter filtrate collection vessel with which the filter device is paired as prefilter.

In some embodiments, there is no substantial reservoir space above the filter element, e.g., with sample being pumped (or gravity fed) to the filter element interior directly from the culture vessel, or through a transfer conduit.

V. Additional aspects. The filter device can be paired with a final filter to act as a prefilter. The most common final filters are the ubiquitous commercially available disposable flask filters. These filters include a disk filter between an upper sample reservoir and a lower filtrate collection flask. The filter is in a housing that includes a side arm conduit providing a path for a vacuum source to evacuate the collection flask, creating a pressure differential to drive the filtration process. For example, see filter flasks by NALGENE™ and MILLIPORE™. These disposable filter units range in capacity from about 50 ml to 100 ml, 150 ml, 250 ml, 500 ml, 1 L, 2 L, or more. One thing these disposable filter units have in common is an upper reservoir ("funnel") with a top edge in a horizontal plane. The upper flanges of the filter devices described herein can rest and seal against the disposable filter top edge so that filtration by the filtration device prefilter can be accelerated by the same vacuum used to drive filtration in the disposable final filter.

In another aspect, the present filter or the disposable final filter can be provided with a dedicated vacuum or pressure pump. That is, instead of providing vacuum from a "house vacuum" system through a vacuum hose, the present filter system can be powered by an attachable, or disposable, vacuum pump. In a preferred embodiment, the vacuum pump is configured to provide a greater pressure differential than a typical house vacuum system. The disposable pump can comprise a simple disposable working pump head (e.g., diaphragm, vane, piston) adapted to use with a non-disposable power unit.

In an alternate configuration of the filter device, filtration is by gravity flow, without the need to provide an additional pressure differential across the filter element.

The filter devices described herein could act as final filters, e.g., incorporated as the filter element in a disposable filter unit. That is, the present filter could replace the disc filter commonly provided in commercial disposable filter systems. The housing act as a manifold and include a side arm conduit allowing evacuation of air from a bottom filtrate vessel.

Although the present discussions refer mostly to cell culture samples, the present devices and methods are not so limited. The filter devices are suitable for filtration of any fluid containing any particles. For example, the filter devices can be used to filter particles out of air, to filter lubricants and fuels for machinery, to filter fluids in food processing methods, and/or filter process intermediates or final products in any number of industrial processes.

It is envisioned that an alternate filtration device can be configured with the flow director and filter element exchanging places. For example, in FIG. 1, the flow director of 13 could be exchanged with a similarly located filter and the filter 12 could be a flow director wall that provides, e.g., the continuously reducing sample space from the top of the filter to the bottom.

VI. Filtration Methods. The filtration devices described herein can be used in a variety of ways. They can be primary standalone filters, e.g., run by gravity or by a pressure differential. Because of the large filter surface area and efficient fluid flow direction, the devices can also act as prefilters receiving difficult samples, e.g., containing large amounts of particles or cells.

In one aspect of the methods, the bottom surface of a housing top flange can be placed over the mouth of a vacuum vessel, sample poured into the filter interior space, and a vacuum applied to the vessel to collect filtrate into the vessel. Alternately, the filtration device can incorporate a fitting, such as a threaded fitting to screw-fit onto the vacuum vessel, or to a filtrate pumping system.

Optionally, the filter devices can be used as prefilters. Expression host cells can be grown to near end of growth phase in liquid suspension culture. A filtration device described herein can be placed so that the filter element is in the sample reservoir of a final filter system, with the top flange sealing against the top edge of the final filter reservoir. The suspension culture (e.g., without previous centrifugation to pellet cells) can be poured into the sample reservoir of the filter device and a vacuum applied to the filtrate collection vessel of the final filter system. The lower pressure in the collection vessel can draw air out of the space between the final filter dick and the present filter device, forcing a tighter seal between the top flange and final filter top edge. As a relative vacuum develops in the space, conditioned media is drawn through the filter device filter element to collect in the final filter sample reservoir. Because most of the cells are removed from the conditioned media, the entire filtrate collection vessel can be filled through the final filter disk without a clogging incident.

EXAMPLES

The following examples are offered to illustrate, but not to limit the claimed invention.

Example 1—Conical Filter with Parabolic Flow Director

A pleated filter is splayed into a generally conical shape that cooperates with a flow director to provide the tapered sample space between the filter and flow director, as shown in FIG. 2. The design further provides more external space at the bottom where greater filtrate flows are expected to be experienced. In addition, the design enhances initial flows nearer the top of the filter element so that less material accumulates at the bottom of the filter, thus aiding in filtration and collection of residual sample volumes at the end of a filtration step.

A filtration device 20 includes a conical pleated filter element 22. Inside the filter element is a flow director 23 to direct fluid flows against the interior surfaces of the filter element. The housing includes upper flange 24 providing a seal 26 to interact with the top edge of an appropriate disposable filter flask, to seal the top of the filter element, and on which to mount sample reservoir 25. The housing can further include ribs (not shown) running within some filter pleats as reinforcement against pressure differentials experienced during filtration processes.

Example 2—Filter Device Pre-Filtering for a Disposable Final Filter

Figure 3:
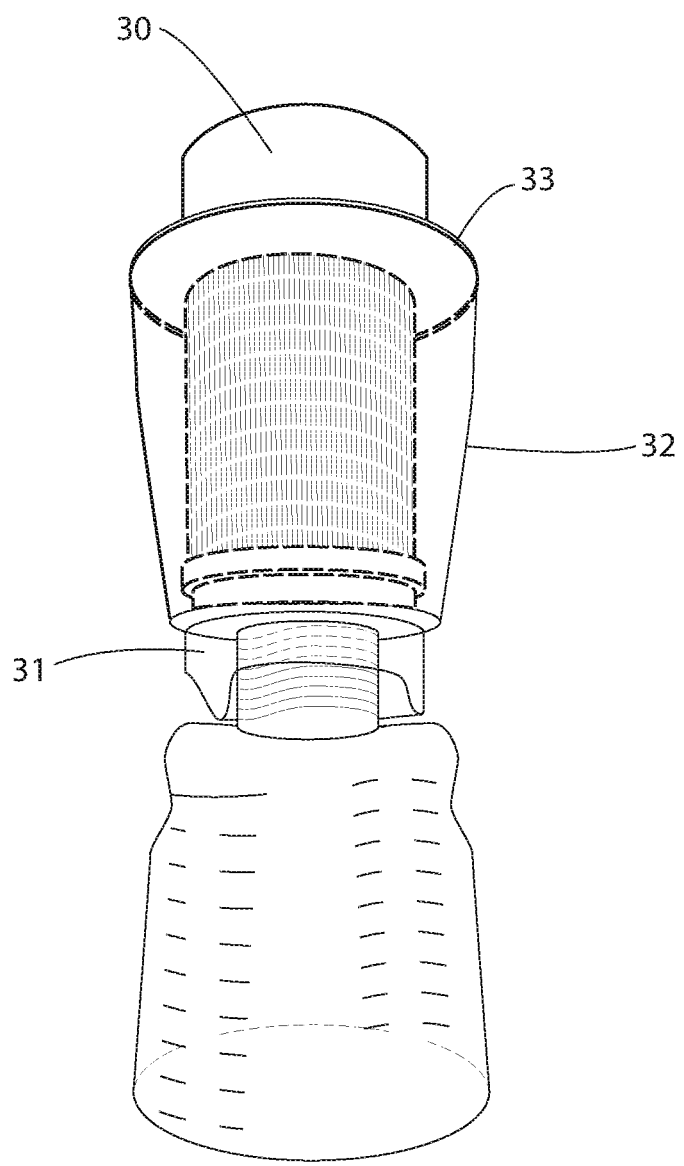
FIG. 3 is an image of a filter device installed as a prefilter to a disposable filter flask unit.
Figure 4B:
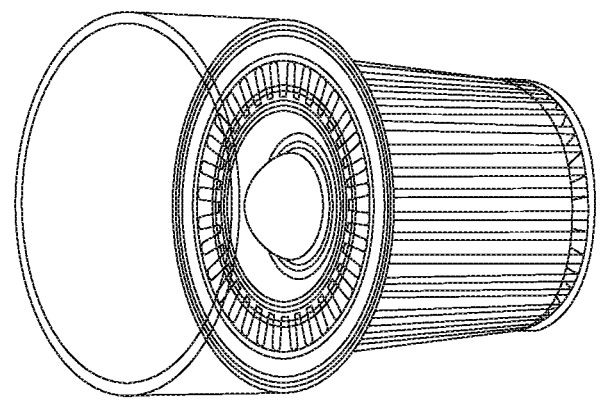
FIGS. 4A and 4B show perspective views of 50 ml and 1 L filters.
Figure 4A:
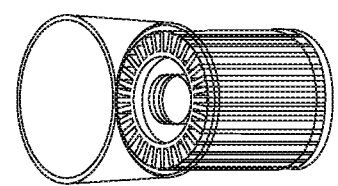
Figure 4C:
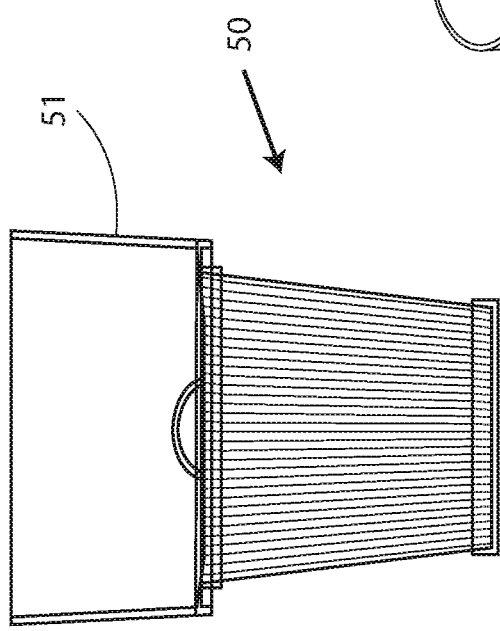
FIG. 4C shows a side view of a 1 L filter and FIG. 4D a top view of a 1 L filter.
Figure 4D:
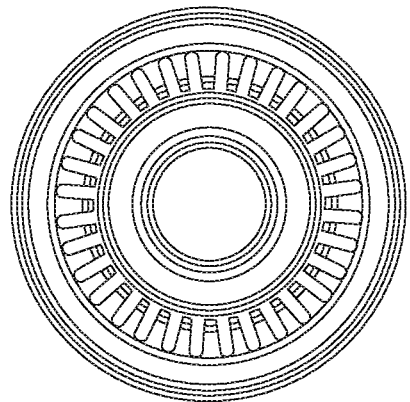
FIG. 4 is a schematic diagram of exemplary 50 ml and 1 L filter systems.
FIG. 4E shows a side view of a 50 ml filter and FIG. 4F a top view of a 50 ml filter.
Figure 4E:
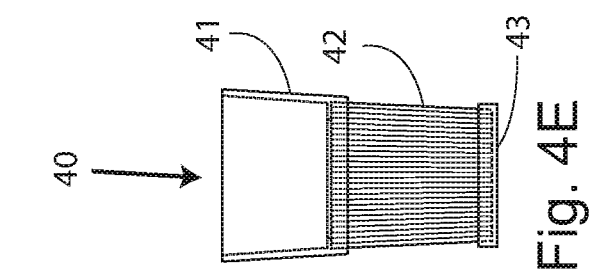
Figure 4F:
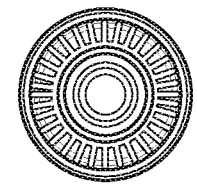

The filter devices described herein can be inserted into and into a final filtration flask system to act as a prefilter. As shown in FIG. 3, a filter device 30 described herein was placed into a disposable final filter system 31 sample reservoir 32 with upper flange 33 in sealing contact with the top edge of the final filter sample reservoir.

Example 3—Exemplary Culture Harvest Filter Devices

Harvest Max 50 and Harvest Max 100 filter systems are presented in FIGS. 4A to 4F. Scale is in [inches] and millimeters.

The Harvest Max 50 filter 40 is sized to receive 50 ml of sample into sample reservoir 41. The inside surface of the reservoir can include internal threads adapted to functionally interact with the male external threads of a culture bottle, e.g., for direct sealed transfer of cell culture sample form a culture vessel to the filter input (afferent) side.

In use, a cell culture is completed in a culture flask, and the reservoir end of the filter device is attached and sealed to the top opening of the culture flask. Next, a vacuum flask is sealed to the flange around the bottom of the filter reservoir. The assembly is stood with the culture flask inverted on top of the filter and vacuum flask. Sample flows into the filter reservoir and space between the filter element and flow director. Sample filtrate flows through the filter and into the receiving flask at the bottom of the assembly.

Alternately, the filter device can have a non-perforated housing entirely around the exterior of the filter element 42. Further, the bottom 43 of the housing can be sealed from the interior of the filter element but open to the space between the exterior of the filter element and the non-perforated housing wall. The housing bottom can also include a threaded surface or seal adapted to sealably attach to a receiving vessel, such as a vacuum flask. Flow from the culture flask, through the filter, and into the receiving vessel can be by force of gravity, relative vacuum (less than atmospheric pressure) in the receiving vessel, and/or a pressure pump on the afferent side of the filter.

Figure 5:
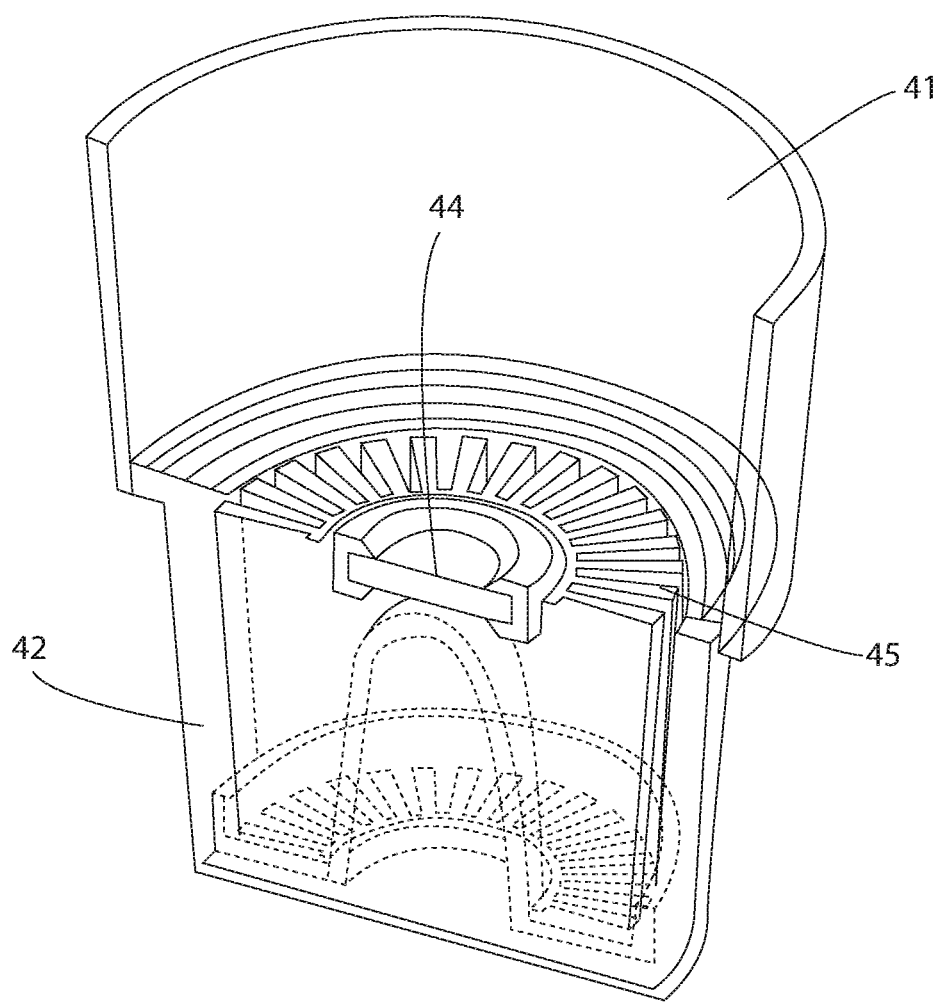
FIG. 5 is a schematic diagram showing a cross-section of a Harvest 50 filter system.
Figure 8:
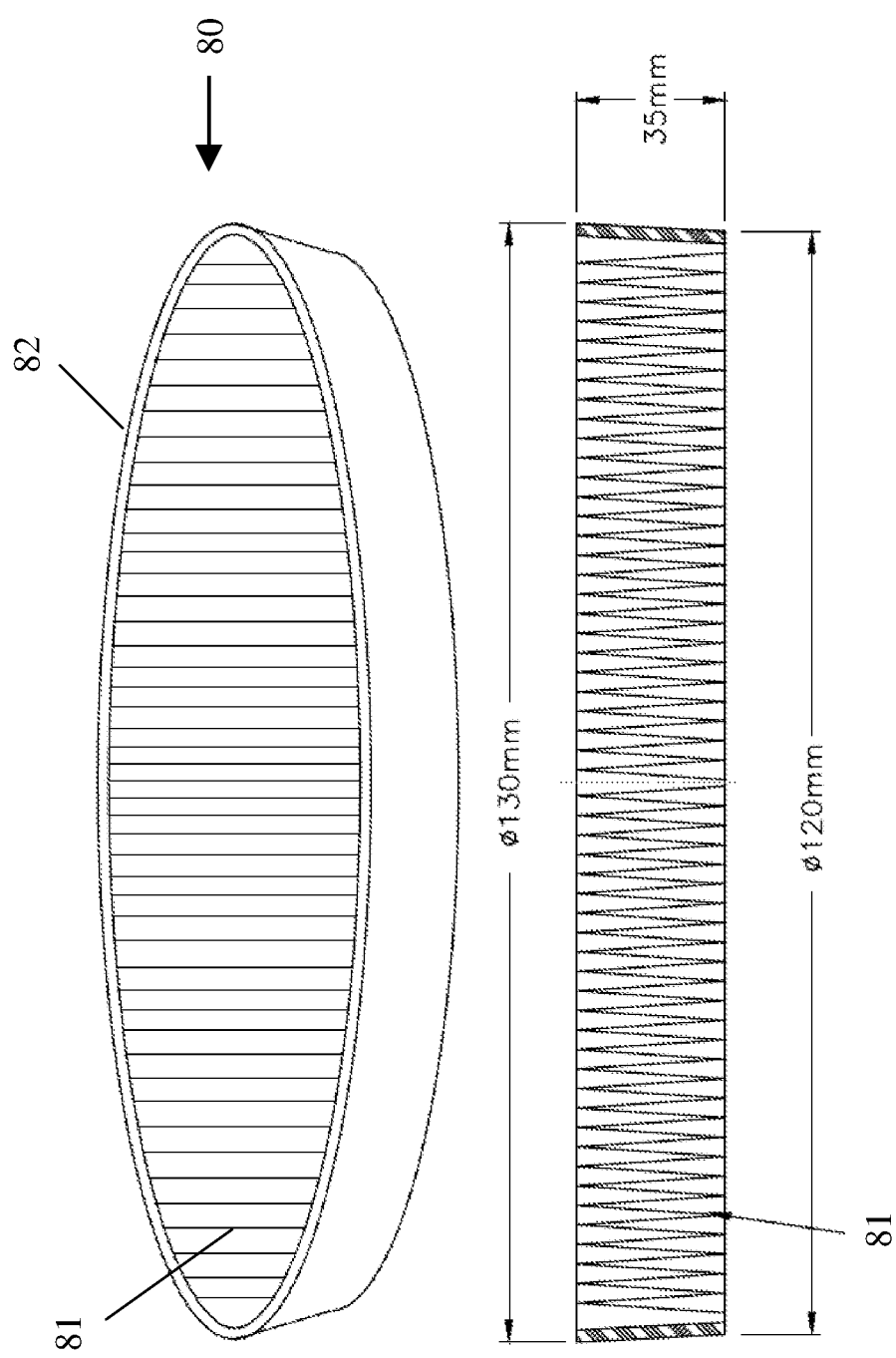
FIG. 8 is a schematic diagram of a pleated supplemental filter optionally placed between the filter device filter element and the final filter.
Figure 9A:
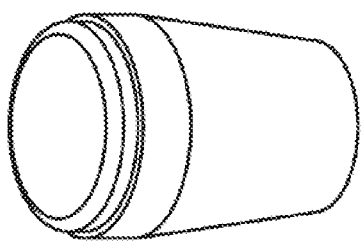
FIGS. 9A to 9D are exemplary diagrams of a center sleeve shaped to displace retentate from the interior space of a prefilter, e.g., near the end of filtration, or for small samples.
Figure 9C:
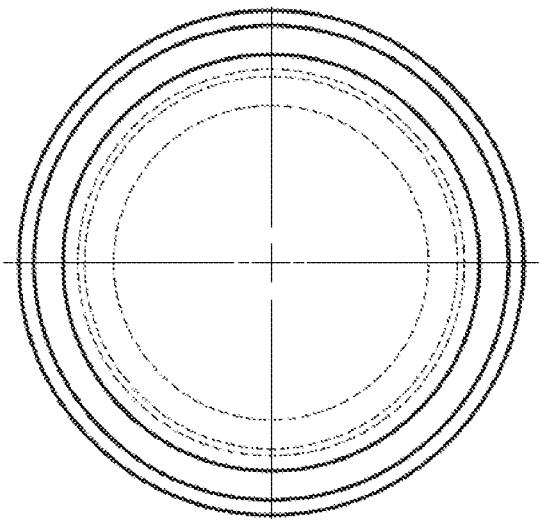
Figure 9B:
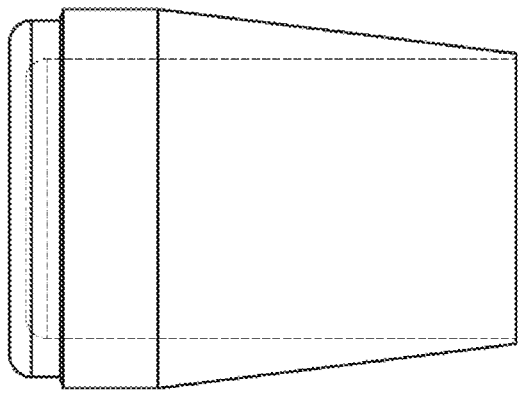
Figure 9D:
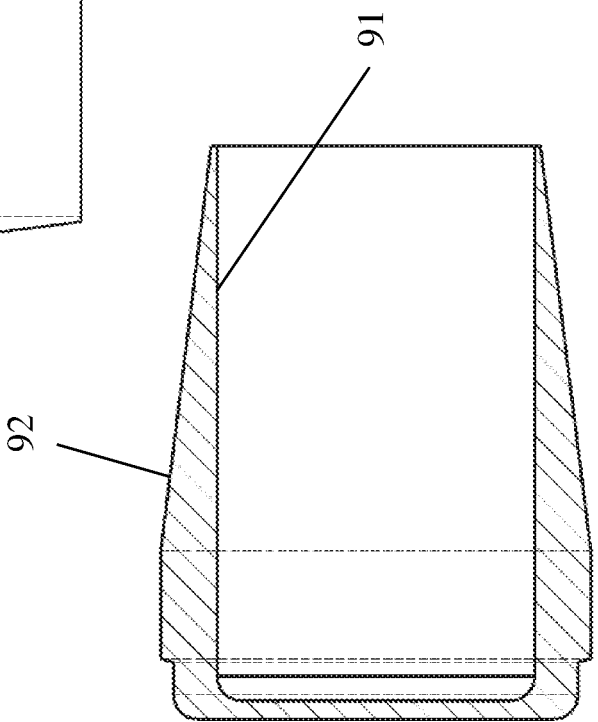

A cross section of a Harvest Max 50 filter is presented in FIG. 5. Note, an optional multi-layer pre-filter insert 44 can be mounted over the filter interior space, e.g., to remove agglomerations of cells. The prefilter itself can be pleated, as shown in FIG. 8. Pleats of the main filter element 45 are finer depth filter media with pores scaled to remove the bulk of remaining cells, cellular debris, and finer particles.

The Harvest Max 100 filter 50 is sized to receive up to 1 L of sample into sample reservoir 51. The inside surface of the reservoir can include internal threads adapted to functionally interact with the male external threads of a culture bottle, e.g., to directly receive sample from an attached culture bottle or pump hose adaptor. The Harvest Max 100 can be configured to function as per the Harvest Max 50, described above.

Figure 6:
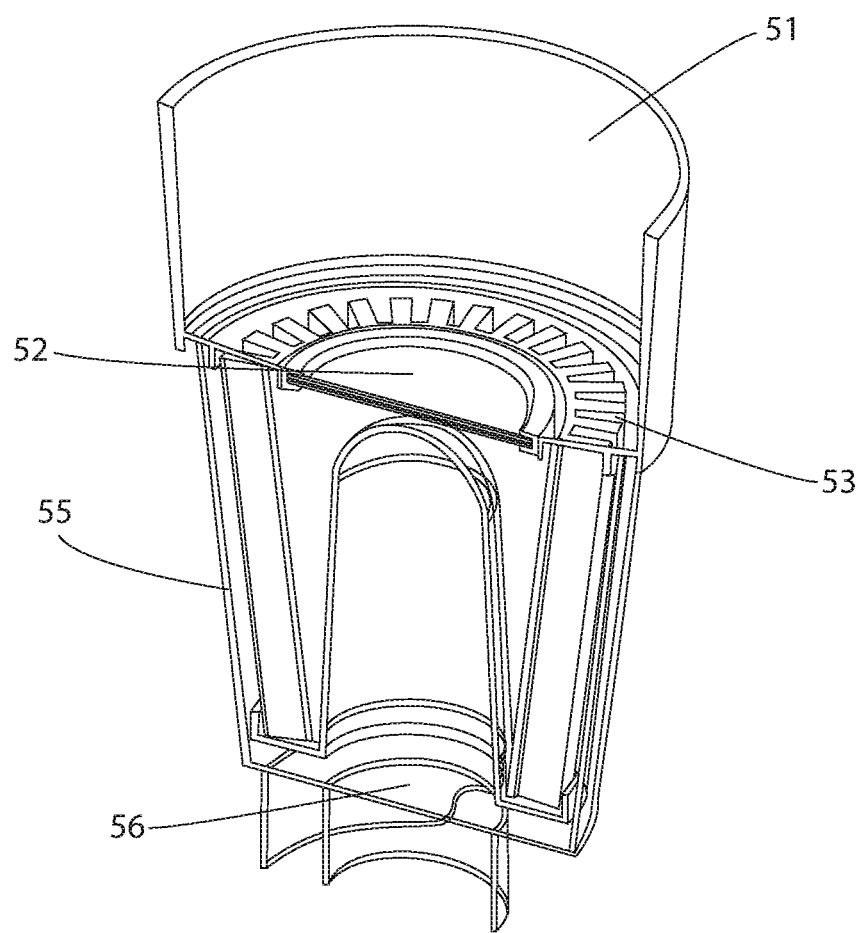
FIG. 6 is a schematic diagram showing a cross-section of a Harvest 100 filter system.

A cross section of a Harvest Max 50 filter is presented in FIG. 6. Note, an optional multi-layer pre-filter insert 52 can be mounted over the filter interior space, e.g., to remove agglomerations of cells. Pleats of the main filter element 53 are finer depth filter media with pores scaled to remove the bulk of cells, cellular debris, and finer particles. The outlet at the bottom of the filter housing can have, e.g., internal threads to screw on to a filtrate flask. Alternately, the filter bottom can seal to the top of a final filter. Optionally the bottom can have fittings to interact with a pump, e.g., with hoses to transfer filtrate to a desired receiving vessel.

Note the filter device is resting in the reservoir 55 of a final filter unit having final filter 56.

Example 4—Exemplary Filter Devices

The Harvest Max 1000 filter system is presented in FIG. 7.

The system includes the filtration unit 70 and optional single use pump head 71. The Harvest Max 1000 can receive a liter into reservoir 72, and can also have samples pumped into the reservoir through input port 73. The filter device typically has the filter capacity to filter up to, e.g., 10 liters of uncentrifuged end phase eukaryotic cell culture.

In use, sample can be applied to the sample reservoir to flow by gravity into a receiving vessel. Optionally, the sample can be drawn through the filter by a relative vacuum in a receiving vessel, or driven by the force of a pump installed between the filter outlet and receiving vessel inlet.

Note the filter device can be configured to have a housing (skirt) coming down from the reservoir to surround a top portion of the filter element, while the final filter reservoir surrounds a bottom portion of the filter element. In this way, a longer filter element can be provided than would fit within the height of the final filter reservoir. Optionally, filter devices having filter elements too long to fit in the reservoir can be placed upon an adaptor ring or cylinder that sealably spaces the filter device an appropriate distance above the final filter reservoir.

In many embodiments, e.g., wherein the culture vessel is large or ungainly (e.g., 10 L culture bags), a pump can be used to continuously or intermittently fill the filter sample reservoir. Such a pre-reservoir pump can optionally provide the force driving filtrate through the filter element. Optionally, sample can be received by gravity from culture containers mounted above the filter device.

Example 5—Supplemental Filter Before the Final Filter

Supplemental filters can be located between the filter element and final filter. The supplemental filter is typically a horizontal disk configured to mount or rest above final filter.

FIG. 8 shows an exemplary supplemental filter 80 for mounting across the filtrate flow below the filter device filter element. The filter material 81 is pleated and surrounded with a supportive collar 82. This supplemental filter can be used to further assist the Harvest Max to increase throughput. The average pore size of the supplemental filter is typically between the average pore size of the filter device filter element and the average pore size of the final filter. The supplemental filter can have any appropriate average pore size, e.g., 0.2µ or 0.45µ or 0.65µ membrane, pleated to have ~100 cm² area or more to further protect the final filter in the flask with limited area i.e. 60 cm2.

Example 6—Attachments to Standard Culture Vessels

Cell culture products, such as 5 L shaker bottle containers, can have transfer caps for direct connection to the afferent side of the filter devices, or connection through tubular connections. One or two of their 5 L units can be harvested one at a time with a connector of ⅜" Legris fitting to ⅜" clear vinyl or other tubing with a ⅜" Female QDC quick disconnect connector from Harvest Max 1000 to the top of the 5 L which has a ⅜" MQDC. Typically, a direct connect for gravity harvest to clarification can be accomplished.

Also with the Harvest Max 1000 it is important to note a direct harvest can be made from a G.E. or other 22 L (10 L working volume) cell culture bag via a female ⅜" CPC connector on the bag and an adaptor from the top of the Harvest Max (Legris X ⅜" MQCD).

Example 7—Center Sleeve

At the end of a filtration, even with the low retentate filters described above, there can come a point where the level of sample retentate drops below the top of the filter element. Flow rates can slow, air may bubble through the uncovered top filter surfaces, and remaining retentate may contact only the lower filter element, where pores may be clogged with debris.

Filters with flow directors, as described above, have low dead volumes on the sample side of the filter, compared to standard filter systems. However, for particularly small or precious samples, technicians may be tempted to rinse the retentate side of the filter to chase out additional sample. However, this will dilute the filtrate.

To solve this problem, we have developed a center sleeve device to take up the internal volume, e.g., between the filter element and flow director element. As shown, e.g., in FIG. 9, a center sleeve 90 can be provided with a shape closely approximating the internal space between the filter and flow director.

The center sleeve can be any shape that effectively displaces a significant proportion of retentate from the interior volume of the filter section of the filter device. For example, the sleeve internal surface 91 can be shaped to uniformly contact the flow director surface, e.g., leaving no volume between the flow director and sleeve. The sleeve can be shaped to so that the outer sleeve surface 92 uniformly contacts the filter element internal surface, or to contact inner folds of the pleated filter, e.g., leaving a minimum volume of retentate between the pleats.

Alternately, depending, e.g., on the amount of debris or flow characteristics of the sample, the sleeve can be shaped to leave a small space between the sleeve and filter. For example, an installed sleeve can leave between less than 0.1 mm and 10 mm or more of clearance between the outer sleeve and filter element inner surface; between 0.3 mm and 5 mm, between 0.5 mm and 3 mm, or about 1 mm.

In use, a prefilter device can be placed into the reservoir of a final filter, and sample poured into the sample reservoir of the prefilter device. With vacuum applied to the final filter, sample is drawn past the flow director and through the prefilter filter element. As the sample retentate is reduced in volume, the top meniscus will drop below the top of the filter element. Filtration will slow due to the reduced total filter surface contact, and tendency of the lower filter to be more clogged than the upper filter element. At the filtration technician's discretion, the center sleeve can be inserted into the interior space of the prefilter device, e.g., between the flow director and filter element, displacing retentate up to higher levels of the filter element. Filtrate flow will increase, entry of air into filter pores is avoided, and the filtrate harvest efficiency will be increased.

Example 8—Filters with Inner and Outer Filter Elements

The amount of filter surface area in the prefilter devices can be increased by, e.g., adding a filter pack to the space interior to the first outer filter element. For example, the flow director can be a filter element.

As shown in FIG. 10, the prefilter device 100 can include an inner filter 101 inside of the outer filter element 102. Sample introduced to reservoir 103 to pass between the inner and outer filter elements into inner space 104. Filtrates can pass through either the inner or outer filter element. Filtrate passing through the inner filter element 101 can pass, e.g., into the reservoir of a final filter through filtrate exit port 105. Note, the inner volume 104 between the inner and outer filter elements can be tapered toward the bottom of the filter device in a manner similar to filters described herein having a flow director.

Example 9—Adaptor to Allow Prefilter Use on Smaller Final Filters

It can be desirable to prefilter a small volume into a smaller final filter, e.g., having a smaller sample reservoir. The problem can be that the prefilter element may be too long to allow the prefilter seal flange to contact the final filter reservoir opening.

In such a case, an adaptor ring can be used to fill the space between the prefilter sealing flange and the top of the final filter reservoir. Such a ring can include resilient sealing surfaces on the top and/or bottom surface to aid in sealing at the adaptor prefilter interface and the adaptor final filter reservoir interface.

Example 10—Course Filter Before Prefilter

In certain cases, e.g., where input suspensions include significant amounts of clumped or aggregated materials, flows through the prefilter device can be improved by including a course filter disk afferent to the prefilter. In many cases a course disk 111 (see FIG. 11) can be positioned, e.g., across the bottom of the prefilter reservoir (entry to filter element internal space) to remove gross particles before they can contact the prefilter filter element.

In an embodiment, a course filter ring 111 included a triple laminated cotton filter disk 112 mounted central to a sealing ring 113. The filter disk should have a larger average pore size than the distal prefilter element. The ring can include a resilient sealing surface.

It is understood that the examples and embodiments described herein are for illustrative purposes only and that various modifications or changes in light thereof will be suggested to persons skilled in the art and are to be included within the spirit and purview of this application and scope of the appended claims.

While the foregoing invention has been described in some detail for purposes of clarity and understanding, it will be clear to one skilled in the art from a reading of this disclosure that various changes in form and detail can be made without departing from the true scope of the invention. For example, all the techniques and apparatus described above can be used in various combinations. All publications, patents, patent applications, and/or other documents cited in this application are incorporated by reference in their entirety for all purposes to the same extent as if each individual publication, patent, patent application, and/or other document were individually indicated to be incorporated by reference for all purposes.

What is claimed is:

1. A filter device comprising:
   a filter element surrounding a central axis and comprising a top end, a bottom end, an external filter surface, an internal filter surface, and an internal space between the central axis and internal surface;
   a flow director impermeable to liquids, comprising a top end and bottom end, and positioned within the internal space occupying a larger proportion of a cross-section of the internal space perpendicular to the central axis toward the bottom end of the filter than the flow director occupies toward the top end of the filter;
   wherein the filter device is configured so that a sample liquid applied to the flow director top end wets the filter top end.

2. The device of claim 1, wherein the filter is a pleated filter.

3. The device of claim 1, wherein the filter is cylindrical, conical, or splayed outward toward the top end.

4. The device of claim 1, wherein the flow director has a parabolic cross-section in a plane through the central axis.

5. The device of claim 1, further comprising a shoulder flange extending radially directly out from the filter top end in a plane perpendicular to the central axis.

6. The device of claim 1, wherein a reservoir is positioned above the filter top end and hermetically sealed to the filter top end.

7. The device of claim 6, wherein the reservoir has a top opening diameter larger than a diameter of the filter internal space and has a volume ranging from 50 ml to 2 L.

8. The device of claim 1, wherein a bottom end of the flow director comprises a lateral flange extending out radially, which flange comprises a top surface in sealing contact with the filter bottom end.

9. The device of claim 1, further comprising an integrated vacuum pump.

10. The device of claim 1, positioned and hermetically sealed in a reservoir of a vacuum filter apparatus.

11. The device of claim 1, further comprising a removable central sleeve not in integral contact with the filter element and shaped to fit into an interior space between the filter element and the flow director, whereby positioning the sleeve into the interior space displaces sample up to provide improved contact with the filter element.

12. A filter device comprising:
   a first cylindrical or conical filter element mounted within a cylindrical or conical housing and the filter element a central axis, a top end, a bottom end, an outer surface, an inner surface, and an inner space having a volume between the central axis and filter inner surface;
   wherein the housing comprises:
   a cylindrical or conical body comprising a top, bottom, and sides;
   a housing top end comprising a shoulder flange extending radially from a central opening; wherein the flange extends from the central opening across the filter top end, and extends radially in a plane beyond the body; and,
   a housing bottom end extending across the cylindrical body bottom covering the bottom of the inner space.

13. The filter of claim 12, further comprising a flow director impermeable to liquids, comprising a top end and a bottom end; wherein the flow director is mounted within the inner space and comprises a smaller cross-section perpendicular to the central axis at the flow director top end than a cross-section at the flow director bottom end.

14. The filter of claim 12, wherein the filter element comprises a pleated sheet.

15. The filter of claim 12, wherein the shoulder flange extends radially beyond the housing body a distance ranging from about 0.25 inches to about 3 inches.

16. The filter of claim 12, wherein the shoulder flange further comprises a sealing surface on a planar bottom side of the flange extension beyond the body.

17. The filter of claim 12, wherein the filter element top end is fluidly sealed to the shoulder flange.

18. The filter of claim 12, wherein the filter bottom end is fluidly sealed to the housing bottom end.

19. The filter of claim 12, wherein the housing bottom does not include an outer sealing surface or the housing bottom does not include a flange extending radially beyond the housing body.

20. The filter of claim 12, wherein the housing body is perforated around the sides.

21. The filter of claim 13, wherein a vertical cross-section through a center of the flow director is a conic section.

22. The filter of claim 13, wherein a radial distance between the flow director top end and the filter is at least two times a radial distance between the flow director bottom end and the filter.

23. The filter of claim 13, wherein the top end of the flow director is at least 0.5 inch below the filter top end, and the bottom end of the flow director is not more than 0.25 inch from the filter bottom end.

24. The filter of claim 12, further comprising a second filter inside the conical filter element, wherein an average pore size of the second filter is greater than an average pore size of the conical filter element, providing filtrate to the first filter element.

25. The filter of claim 12, mounted within a receiver (sample reservoir) of a disposable filter/flask unit having an average filter pore size at least 50% less that an average pore size of the filter element.

26. The filter of claim 12, further comprising a prefilter (depth filter) element extending across an entry to the inner space of the filter device positioned to prefilter sample before it contacts the first filter element.

27. The filter of claim 12, wherein the flange extends from the central opening radially across the top of the filter.

28. The device of claim 6, wherein the reservoir is positioned above the filter top end and configured to introduce a fluid directly from the reservoir into the filter interior space.

29. The device of claim 6, wherein the reservoir is configured to receive a liquid poured into the top of the device, without use of a conduit port.

30. The device of claim 1, wherein the device in use filters a liquid sample with the liquid entering the filter from the inside, with filtrate exiting out from the external filter surface.

31. The device of claim 1, wherein the a bottom half of the flow director takes up more of the filter element inner space than a top half of the flow director takes up of filter element inner space.

32. The filter of claim 1, wherein the flow director contacts the filter element at most only at the filter element bottom.

33. The device of claim 1, wherein the device is positioned upright in a gravitational field during said application of the liquid.

34. The device of claim 33, wherein the amount of liquid applied is capable to fill the internal space.

35. The device of claim 32, wherein the device further comprises an open topped sample reservoir above the filter element.

36. The filter of claim 12, wherein the filter element is within the housing body.

37. The filter of claim 13, wherein the filter device is configured so that a sample liquid applied to the flow director top end wets the filter top end.

38. The filter of claim 13, wherein the flow director contacts the filter element at most only at the filter element bottom.

* * * * *